United States Patent
Weinmann et al.

(10) Patent No.: US 11,188,421 B2
(45) Date of Patent: Nov. 30, 2021

(54) METHOD AND APPARATUS FOR DETECTING AND REMEDYING SINGLE EVENT EFFECTS

(71) Applicant: Honeywell International Inc., Morris Plains, NJ (US)

(72) Inventors: Jacob Weinmann, Maplewood, MN (US); Donald Horkheimer, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 474 days.

(21) Appl. No.: 16/049,393

(22) Filed: Jul. 30, 2018

(65) Prior Publication Data
US 2020/0034239 A1    Jan. 30, 2020

(51) Int. Cl.
*G06F 11/14*    (2006.01)

(52) U.S. Cl.
CPC ........ *G06F 11/1441* (2013.01); *G06F 11/143* (2013.01); *G06F 11/1428* (2013.01); *G06F 11/1438* (2013.01); *G06F 2201/805* (2013.01)

(58) Field of Classification Search
CPC ............. G06F 11/1438; G06F 11/0757; G06F 11/1441; G06F 11/1428; G06F 11/143; G06F 2201/805
See application file for complete search history.

(56) References Cited

U.S. PATENT DOCUMENTS

| | | | |
|---|---|---|---|
| 8,563,909 B2 | 10/2013 | Janiak et al. | |
| 2002/0152425 A1* | 10/2002 | Chaiken | G06F 11/1438 |
| | | | 714/23 |
| 2010/0306518 A1* | 12/2010 | Suryawanshi | G06F 1/24 |
| | | | 713/1 |
| 2011/0078498 A1 | 3/2011 | Flatley | |
| 2011/0099421 A1 | 4/2011 | Geist et al. | |
| 2015/0058659 A1* | 2/2015 | Brundridge | G06F 11/2025 |
| | | | 714/4.11 |
| 2015/0212906 A1* | 7/2015 | Gschwind | G06F 3/0629 |
| | | | 714/15 |
| 2019/0278660 A1* | 9/2019 | Swenson | G06F 11/0793 |

FOREIGN PATENT DOCUMENTS

GB        2455344 A        6/2009

OTHER PUBLICATIONS

Henderson et al., "Incorporating high reliability into the design of microprocessor-based instrumentation", IEE Proceedings—A, Mar. 1991, pp. 105 through 112, vol. 138, No. 2, IEE.
Intellectual Property Office, "Search Report from GB Application No. 1910806.7", from Foreign Counterpart to U.S. Appl. No. 16/049,393, dated May 15, 2020, pp. 1 through 4, Published: GB.
Israel Patent Office, "Office Action from IL Application No. 268023", from Foreign Counterpart to U.S. Appl. No. 16/049,393, filed Jul. 1, 2021, Page(s) 1 through 4, Published: IL.

* cited by examiner

Primary Examiner — Jigar P Patel
(74) Attorney, Agent, or Firm — Fogg & Powers LLC

(57) ABSTRACT

A method is provided. The method of resetting a system, comprising: receiving data from the electronic sub-system; determine if a non-hardware fault is detected; if a non-hardware fault is detected, then performing a software reset of the electronics sub-system; if no non-hardware fault has been detected, then determining if a hardware fault is detected; and if a hardware fault is detected, then performing a hardware reset of the system.

17 Claims, 4 Drawing Sheets

METHOD AND APPARATUS FOR DETECTING AND REMEDYING SINGLE EVENT EFFECTS

BACKGROUND

Radiation deleteriously affects electronic systems, e.g. in outer space. Effects of radiation on electronic systems include single event effects (SEEs) such as single event latch ups (SELs), single event upsets (SEUs), and single event functional interrupts (SEFIs). The SEEs, can degrade the performance of or damage such electronics systems. Conventionally, redundant circuits, complex circuit designs, and/or complex circuit manufacturing processes are used to prevent or remedy such effects. However, these techniques are costly to design and manufacture. Further, these techniques can result in designs that are not stabile, e.g. that have parameters that drift over time. Such instability can detrimentally affect electronic system performance. Therefore, there is a need for a lower cost and more stabile solution.

SUMMARY

A method is provided. The method of resetting a system, comprising: receiving data from the electronic sub-system; determine if a non-hardware fault is detected; if a non-hardware fault is detected, then performing a software reset of the electronics sub-system; if no non-hardware fault has been detected, then determining if a hardware fault is detected; and if a hardware fault is detected, then performing a hardware reset of the system.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
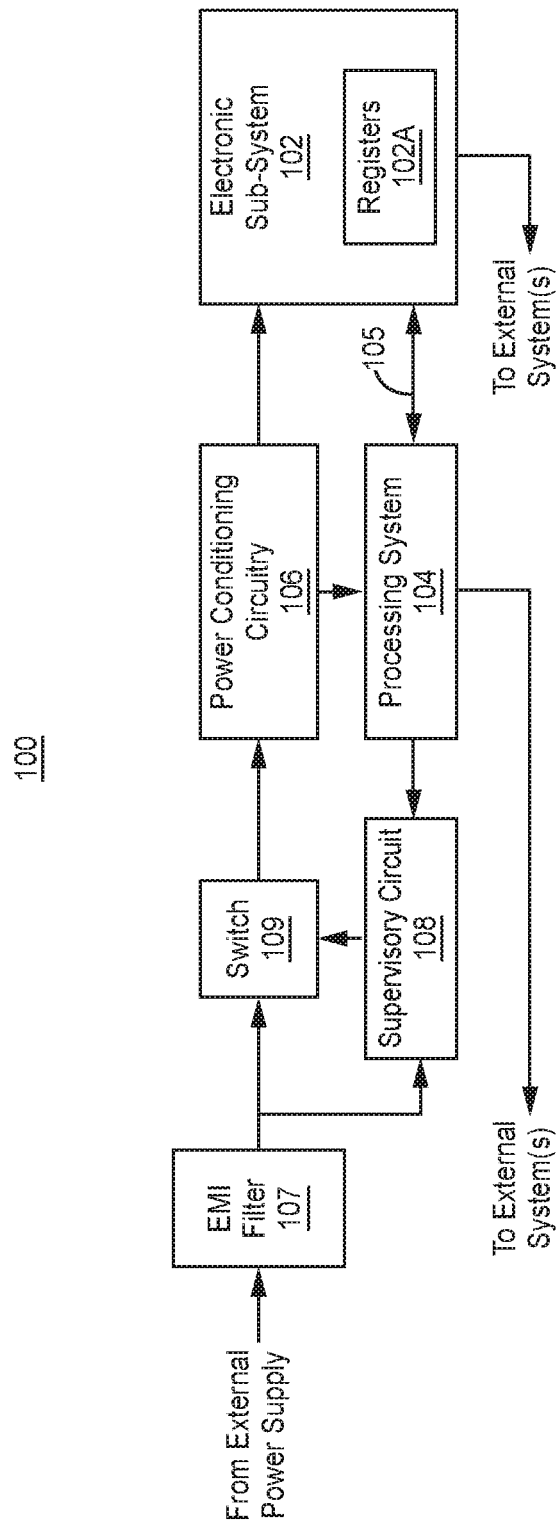
FIG. 1 illustrates a system configured to operate in a radiation environment.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

To solve the aforementioned problem, embodiments of the invention include a system comprising a processing system which executes software to monitor an electronic sub-system, and to perform a software reset of the electronic sub-system and/or a hardware reset of the system. The use of the processing system and software reduces or eliminates the need for redundant circuits, complex circuit designs, and/or complex circuit manufacturing processes. As a result system cost and component stability is respectively diminished and increased.

The processing system, for example, evaluates, on an ongoing basis, certain data stored in, measured by, and/or communicated to and/or from an electronic sub-system. Based upon prior characterization of the system in a radiation environment, the processing system is programmed to recognize that certain data values, e.g. register values or measured signal levels, of certain data types are aberrant (i.e. anomalous) due to, e.g. a SEFI, SEU, and/or SEL. Based upon determining aberrant data, the processing system performs a software reset and/or, a hardware reset to resolve problem(s) created by SEE(s).

FIG. 1 illustrates a system configured to operate in a radiation environment 100. The electronic system comprises an electronic sub-system 102. Optionally, the electronic sub-system 102 includes registers 102A which store configuration data placed in the registers 102A and/or data measured, calculated, and/or received by the electronic sub-system 102. For example, the configuration data may be programmed into the registers 102A during the manufacture of the electronic sub-system 102.

The electronic sub-system 102 is coupled to a processing system 104. The processing system 104 is configured to receive data from the electronic sub-system 102 on an ongoing basis. In one embodiment, the electronic sub-system 102 is coupled to the processing system 104 by a bus 105, e.g. a data bus such as a serial peripheral interface bus. The processing system 104 executes software to analyze the data, received from the electronic sub-system 102, to determine if SEE(s) have occurred.

The data, e.g. stored in the registers 102A, provided from the electronic sub-system 102 to the processing system 104 may include data indicating the status of the electronic sub-system 102A and/or its components. For example, such data may include data indicating that a phase lock loop is locked, that an automatic gain control voltage is within range, and that a temperature is within range.

In one embodiment, the electronic sub-system 102 comprises sensors, such as gyroscope(s) or Micro-Electro-Mechanical system (MEMS) gyroscope(s). However, the electronic sub-system 102 may alternatively or additionally comprise a processing system and/or a communications system. Optionally, the electronic sub-system 102 is coupled to external system(s), and, e.g. provides data such as measurement or other data to those external system(s).

The electronic system 100 further comprises power conditioning circuitry 106 coupled to the electronic subsystem 102 and the processing system 104. The power conditioning circuitry 106 provides regulated power and/or reference voltages to the electronic sub-system 102 and the processing system 104. The power conditioning circuitry 106 may include DC-DC voltage converter(s), low dropout regulator(s), and/or voltage reference(s). Optionally, the processing system 104 is a state machine.

The electronic system 100 further comprises a supervisory circuit 108 and a switch 109. Optionally, the electronic system 100 includes an electromagnetic interference filter 107, e.g. made with inductors and capacitors. The EMI filter 107 suppresses electromagnetic signals from being introduced through power supply lines and which could detrimentally affect the operation of the electronic system 100.

The supervisory circuit 108 is coupled to the switch 109, and is configured to be controlled by the processing system 104 through the supervisory circuit 108. The switch 107 is coupled to an external power supply, e.g. through the optional EMI filter.

The switch may be a single pole single throw switch. However, if more then one voltage is provided by an external power supply, then the switch may have additional poles. When the processing system 104 detects, e.g. aberrant data indicative that a SEL has occurred or when a subsequently described software reset is unsuccessful, then the processing system 104 commands the supervisory circuit 108 to open and then close. Optionally, the supervisory circuit 108 and/or the processing system 104 control how long the switch is opened prior to be again closed, e.g. 10 msec to 999 msec, 50 msec to 400 msec, or 140 msec to 280 msec. Further, optionally, the processing system 104, the supervisory circuit 108, and/or the switch 109 are implemented with radiation hardened circuitry so that radiation effects will not affect their ability to detect and remediate radiation effects in other component(s) of the electronic system 100. Optionally the processing system 104, the supervisory circuit 108, and/or the switch 109 are fabricated with radiation hardening manufacturing processes. Optionally, the processing system 104 includes error detection and correction to further detect and remediate against radiation effects.

Figure 2:
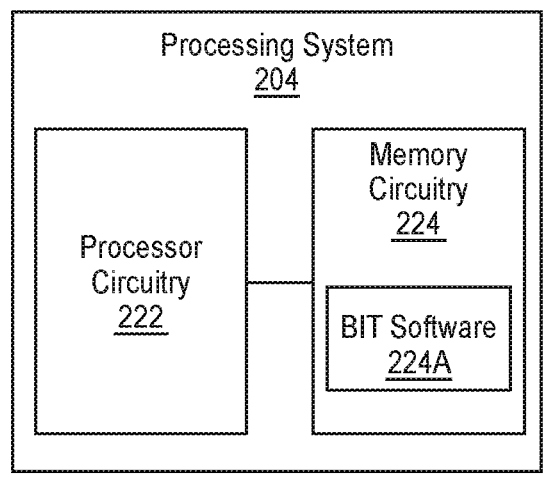
FIG. 2 illustrates one embodiment of a processing system.

FIG. 2 illustrates one embodiment of a processing system 204. The illustrated processing system 204A comprises processor circuitry 222 coupled to memory circuitry 224. The memory circuitry includes built in test (BIT) software 224A that analyzes data obtained and communicated from the electronic sub-system 102 to determine if the data values are anomalous. The BIT software 224A may also perform testing on all or a part of memory, e.g. the registers 102A, in the electronic sub-system 102 by writing a pattern to the memory and reading back the memory to determine if there is anomalous data read back, i.e. that is not the same as the data to be written. The BIT software 224A may also read data from the memory to compare the read data with data expected to be stored in such memory (which is stored in the processing system 204), and thus determine if the read data is corrupted. The BIT software 224A may perform testing on the bus 105, e.g. to determine if timing of bus operations is anomalous.

Upon detecting anomalous data, the BIT software 224A determines whether a hardware fault or a non-hardware fault has been detected. A hardware fault means a fault that requires a hardware reset. A non-hardware fault means a fault that requires a software reset, or a fault that may require a hardware or software reset because the corresponding detected aberrant data indicates a fault occurrence but not the type (software or hardware) of fault. In the latter case, a software reset is performed.

Whenever a software reset is performed, and does not resolve, e.g. eliminate, the detected anomaly, a hardware reset is subsequently performed to attempt to resolve the detected anomaly. A fixed number of software resets may be performed prior to a hardware reset being performed.

A software reset means reloading all or some of the configuration data in the electronic sub-system 102, e.g. the registers 102A, with configuration data stored elsewhere, e.g. in the processing system 104. For example, only configuration data (previously determined as needing to be reloaded when a corresponding anomaly is detected) is reloaded.

Optionally, the processing system 104 is coupled to one or more of the external system(s). Optionally, whenever a hardware reset is performed, and does not resolve, e.g. eliminate, the anomaly, an alarm is sent, e.g. by the processing system 104. This embodiment is further illustrated with respect to FIG. 3 for pedagogical purposes. Optionally, however, the processing system 104 may also or alternatively send an alarm whenever the processing system 104 performs a hardware and/or a software reset. Thus, sending an alarm may be an optional function of the software reset and/or hardware reset.

The alarm may be a signal (e.g. an electrical signal, a data value, or a message) sent to the external system(s). For example, the alarm may inform the external system(s) that the electronic sub-system 102 has an operating error and/or that data sent from the electronic sub-system 102 is potentially erroneous.

Hardware and/or non-hardware faults may arise from anomalous data values stored in, measured by, and/or communicated from the electronic sub-system 102A. This may include, for example:

(a) corrupted configuration data values, e.g. stored in the registers 102A;

(b) aberrant measurement data;

(c) aberrant data calculated by the electronic sub-system 102;

(d) statistical parameter of measurement data or calculated data is aberrant. The statistical parameter may include standard deviation, moving average, root mean square value, peak to peak value, and range or other outlier test statistic calculation;

(e) corrupted data communicated by the electronic sub-system 102 to the processing system 104; and/or (f) an unexpected change in mode of the electronic sub-system 102A or a component thereof.

Hardware faults typically occur due to SEL(s). Software faults typically occur due to SEU(s) and/or SEFI(s).

The following are examples of criteria that indicate a hardware fault:

(a) a register value reads an incorrect or non-zero value;

(b) reference and/or monitored voltages are aberrant (i.e. out of specification); and/or (c) the electronic sub-system 102A or a component thereof unexpectedly changes modes. The following is an example of aberrant measurement data indicative of a hardware fault. An SEL, for example, can cause the power conditioning circuitry 106 to draw excessive current. Even if the current draw of the power conditioning circuitry 106 is not measured, other data provided by electronic sub-system 102 can indicate the excessive current draw. For example, the excessive current draw may increase the ambient temperature of the electronic sub-system 102 and/or cause the voltage level(s) provided by the power conditioning circuitry 106 to the electronic sub-system 102 to deviate from the expected level(s). Correspondingly, temperature sensor(s) and voltage sensor(s) in the electronic system 100, e.g. in the electronic sub-system 102, detect such aberrations. Optionally, the nonstandard measured temperature level(s) and/or voltage level(s) are stored in the registers 102A. The aberrant measured temperature level(s) and/or voltage level(s) are communicated to the processing system 104. The processing system 104, e.g. the BIT software 224A, analyzes the aberrant measured temperature level(s) and/or voltage level(s), and based upon their values determines that a hardware reset is required. Further other specific data, e.g. data patterns, output data, and/or register values may indicate excessive current draw. A hardware fault may otherwise be indicated. For example, a hardware fault may exist when operating parameters of an automatic gain control and/or a phase locked loop (PLL) fall outside specifications, and/or when the PLL loses lock.

The following are examples of criteria that indicate a non-hardware fault:

(a) a register value reads an incorrect or zero value;

(b) measured or calculated value, e.g. from a sensor such as a gyroscope or accelerometer, changes at an aberrant (i.e. out of specification) rate that is too large or too small; and/or (c) the statistical parameter of a measured or calculated value is aberrant (i.e. out of specification); and/or (c) a measured or calculated value, e.g. from a sensor such as a temperature sensor, is aberrant (i.e. out of specification).

A hardware reset will now be described, which entails opening and closing the switch 109. Upon determining that a hardware reset is required, the processing system 104, e.g. the BIT software 224A, issues a command to the supervisory circuit 108 to open and close the switch 109. The command may include the amount of time that the switch 109 is to be opened before being closed. Alternatively, this amount of time may be programmed in the supervisory circuit 108. This technique shall be illustrated for pedagogical purposes. However, it is possible to not use the switch 109 (and possibly the supervisory circuit 108), but rather send control signal(s) from the processing system 104, e.g. through the supervisory circuit 108 or directly to the power conditioning circuitry 106. Such control signals would reset the power conditioning circuitry 106 so as to disable power and then again provide power to the electronic sub-system 102.

Configuration data includes data loaded into the electronic sub-system 102, e.g. the registers 102A, when it is manufactured or initially prepared for use. Such configuration data can include settings to adjust the gain of amplifiers, the characteristics of filters, and/or data converter sample rates. The processing system 102 would include such configuration data, and would compare such configuration data against the configuration data received on an ongoing basis from the electronic sub-system 102. The processing system 104 determines if there is a discrepancy between the two compared sets of data. For example, a register value may read zero or another incorrect value instead of the value that was originally programmed. If the processing system 104 determines that there is a discrepancy between the two compared sets of data, then the processing system 104 would determine that the configuration data in the compared sets has been corrupted. Depending upon the type of discrepant data and the level of discrepancy for each type, the processing system would determine whether to initiate a software reset or a hardware reset. In one embodiment, for corrupted configuration data, a software reset would be performed.

Also, additionally or alternatively, the processing system 104 would include cyclic redundancy check (CRC) values and/or parity bits for all or subsets of the configuration data. The electronic sub-system 102 would generate and send to the processing system 104 on an ongoing basis CRC values and/or parity bits for all or subsets of configuration data. The processing system 102 would include such CRC values and/or parity bits for the data originally stored in the electronic sub-system 102, e.g. the registers 102A. If the processing system determines a discrepancy between CRC values and/or parity bits, then the processing system 104 would determine that the configuration data corresponding to the CRC values and/or parity bits has been corrupted. Depending upon the set or subset of configuration data that is corrupted, the processing system 104 would determine whether to initiate a software reset or a hardware reset. In one embodiment, if corrupted CRC values and/or parity bits are determined, a software reset would be performed.

Measurement data includes data measured by sensor(s), and/or measured reference and/or monitor voltages and/or currents, in the electronic sub-system 102. Such sensors may include, for example, temperature sensor(s), voltage sensor (s), current sensor(s), magnetometer(s), speed sensor(s), torque sensor(s), optical sensor(s), gyroscope(s), and/or accelerometer(s). Calculated data is data calculated by the electronic sub-system 102, e.g. using measurement data. For example, rate of rotation around the axis of an axis of a gyroscope may be calculated based upon frequency or voltage measurements made by the gyroscope. Further, for example, a temperature sensor may provide a voltage or a current level that is used to calculate temperature.

The processing system 104 determines if there are anomal (ies) in the measurement data and/or calculated data. Anomal(ies) in the measurement data and/or the calculated data include data having a fixed value (without any variation, e.g., due to noise), that is excessively noisy, that falls outside of an expected range (e.g. reads a constant zero), and/or that changes slower or faster than expected. Depending upon the type of anomalous measured and/or calculated data and the level of anomaly for each type, the processing system would determine whether to initiate a software reset or a hardware reset. In one embodiment, if anomalous measured and/or calculated data is determined, then a software reset would be performed.

The processing system 104 may determine if statistical parameter(s), e.g. a standard deviation(s), of data measured and/or calculated by the electronic sub-system 102 exceeds corresponding threshold value(s). Each statistical parameter may be calculated by either the electronic sub-system 102, and provided to the processing system 104, or determined by the processing system 104 based upon corresponding data provided by the electronic sub-system 102. Depending upon the type of measured and/or calculated data and the amount that the corresponding amount level of anomaly for each type, the processing system would determine whether to initiate a software reset or a hardware reset. In one embodiment, if the statistical parameter for data measured and/or calculated by the electronic sub-system 102 is determined by the processing system 104 to exceed a corresponding threshold value, then a software reset would be performed.

Data communicated from the electronic sub-system 102 to the processing system 104 may include CRC check value(s) and/or parity bits. The electronic sub-system 102 would generate the CRC check value(s) and/or the parity bits for blocks of data transmitted by the electronic sub-system 102 to the processing system 104. Upon receipt of each block of data, the processing system 104, e.g. the BIT software 224A, would calculate the corresponding CRC check value(s) and/or the parity bits based upon the block of data, and compare the calculated CRC check value(s) and/or the parity bits with the transmitted CRC check value(s) and/or parity bits. If the processing system determines a discrepancy between CRC values and/or parity bits, then the processing system 104 would determine that the configuration data corresponding to the CRC values and/or parity bits has been corrupted. Depending upon the type of communicated data that is corrupted, the processing system 104 would determine whether to initiate a software reset or a hardware reset. In one embodiment, if corrupted CRC values and/or parity bits are determined, a software reset would be performed.

The electronic sub-system 102 would communicate to the processing system 104 a change in a mode of the electronic sub-system 102A or a component thereof. Modes of the electronic sub-system 102A or the component thereof may include, for example, initialization, start, run, stop, factory, maintenance, embedded software download, calibration, standby, continuous conversion, single conversion, read back, and/or test. If the processing system 104 determines that the electronic sub-system 102A or the component thereof has entered an unexpected mode, e.g. from run mode to initialization mode, then the processing system 104 would determine that operation of the electronic sub-system 102A or the component thereof, that has changed modes, is erroneous. Depending upon the mode change (expected and actual modes) and the system or component exhibiting the mode change, the processing system 104 would determine whether to initiate a software reset or a hardware reset. In one embodiment, if a mode change is determined, a hardware reset would be performed.

Figure 3:
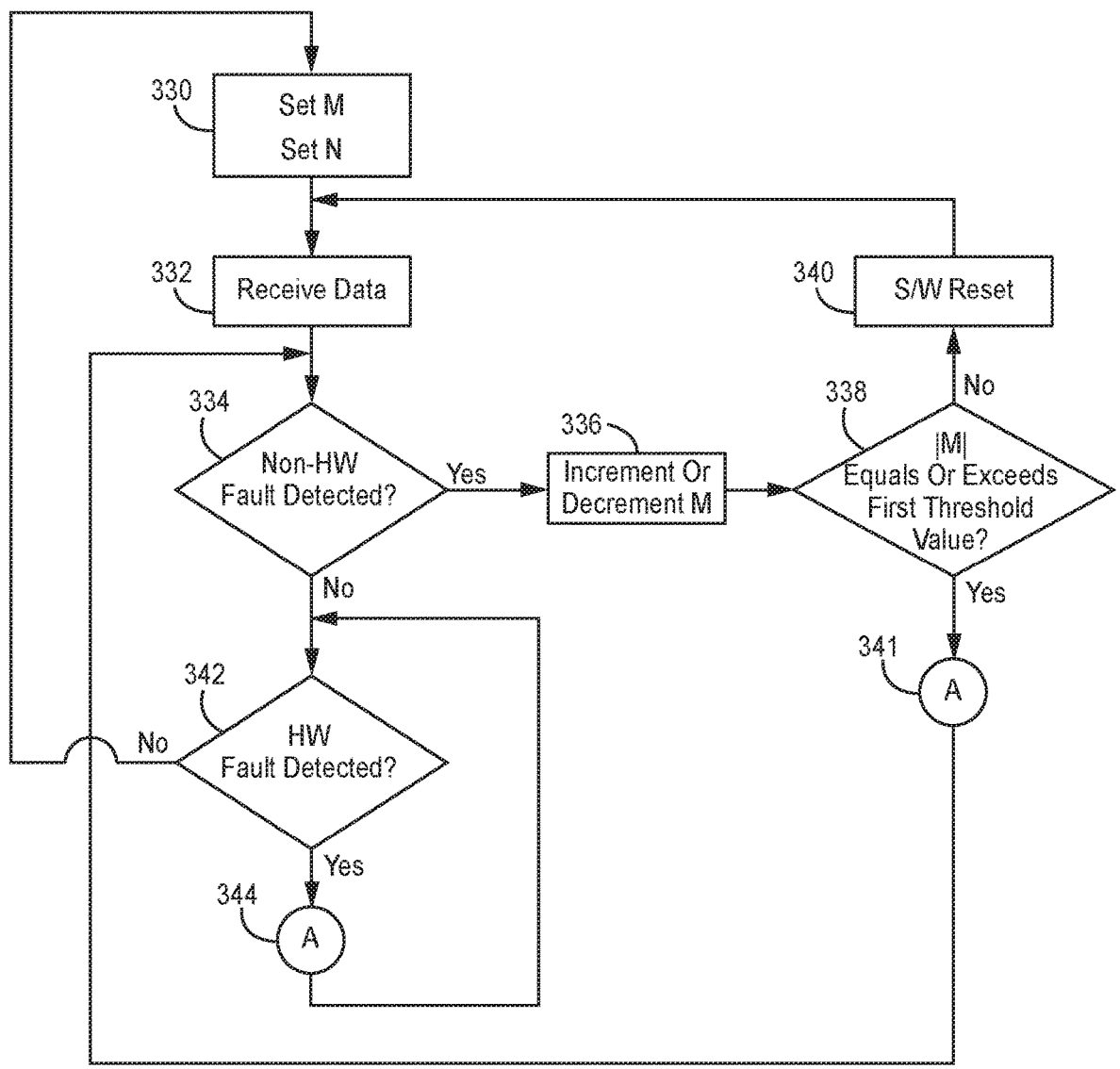
FIG. 3 illustrates an exemplary method of detecting and remedying single event effect(s)

Operation of an exemplary electronic system will now be further described. FIG. 3 illustrates an exemplary method 300 of detecting and remedying SEE(s). To the extent the method 300 shown in FIG. 3 is described herein as being implemented in the system shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 330, set M to a value, e.g. an integer value such as zero or one, and set N to a value, e.g. an integer such as zero or one. M and N may be set to the same or different values. M and N may be respectively referred to as a first value and a second value.

In block 332, receive data, e.g. from the electronic sub-system 102 and at the processing system 104; such data may be any of the data described above including without limitation configuration data, measured data, and/or calculated data. In block 334, determine if a non-hardware (non-H/W) fault is detected.

If a non-hardware fault is being detected, then, optionally, in block 336 increment or decrement M, e.g. by one or another value; typically block 336 will consistently either increment or decrement. Optionally, in block 338, determine if an absolute value of M equals or exceeds a first threshold value. The first threshold value may be a positive or negative number, or zero; the first threshold value may or may not be an integer. If the absolute value of M is not equal to or does not exceed the first threshold value, then in block 340 perform a software reset (S/W reset) and return to block 332. If the absolute value of M is equal to or exceeds the first threshold value, then optionally in block 341 perform sub-routine A which remedies a hardware fault and is subsequently described.

If no non-hardware fault is detected in block 334, then proceed to block 342. In block 342, determine if a hardware fault is detected. If no hardware fault is detected, then return to block 330. If a hardware fault is detected, then in block 344 perform sub-routine A.

Figure 4:
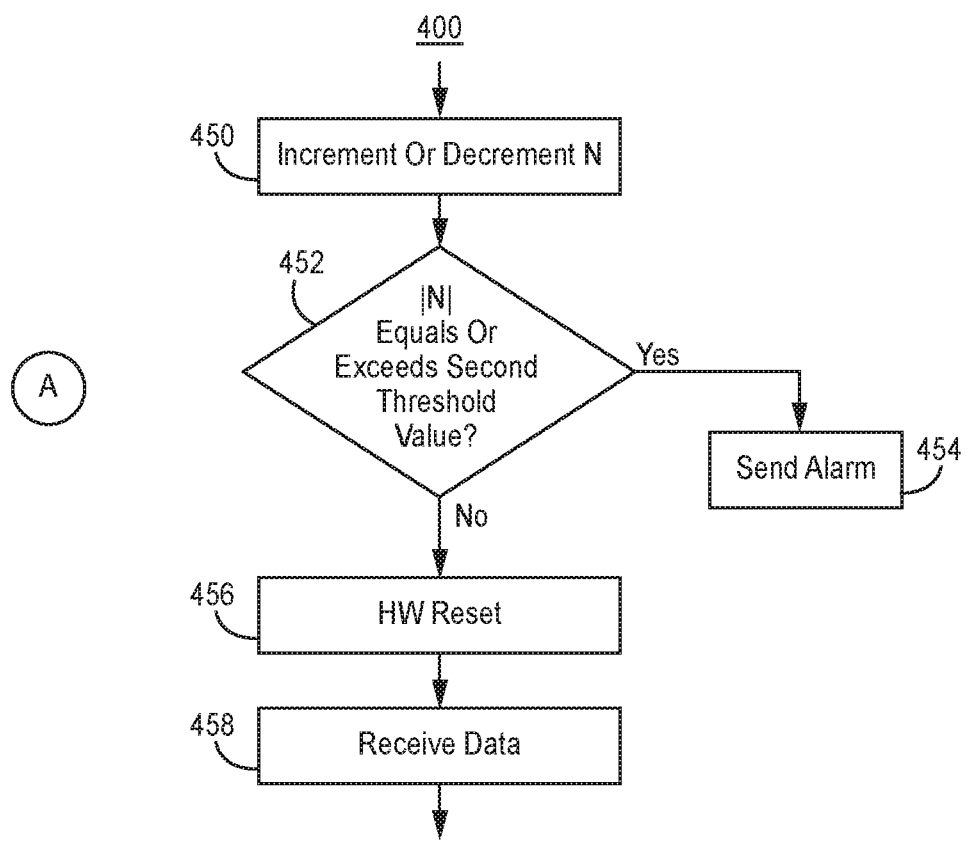
FIG. 4 illustrates an exemplary method of remedying a hardware fault.

FIG. 4 illustrates an exemplary method 400 of remedying a hardware fault. A method to remedy a hardware fault is otherwise referred to herein as sub-routine A. To the extent the method 400 shown in FIG. 4 is described herein as being implemented in the system shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 450, increment or decrement N, e.g. by one or another value; typically block 450 will consistently either increment or decrement N. Optionally, in block 452, determine if an absolute value of N equals to or exceeds a second threshold value. The second threshold value may be a positive or negative number, or zero; the second threshold value may or may not be an integer. If the absolute value of N is not equal to or does not exceed the second threshold value, then in block 456 perform a hardware reset (HW reset). Then, optionally, in block 458, receive data as in block 332.

Optionally, if in block 452 the absolute value of N equals or exceeds the second threshold value, then in block 454 send an alarm, e.g. a signal such as a message. Optionally, the alarm is sent any time a non-hardware fault and/or a hardware fault is detected. Optionally, the alarm is sent to a system user(s) and/or external system(s) to which the electronic sub-system 102 is coupled. The alarm warns the system user(s) and/or external system(s) that the electronic subsystem 102 may not be functioning properly. Optionally, in block 454, if no alarm is sent, then the method stops.

Example Embodiments

Example 1 includes a system, comprising: an electronic sub-system; a bus coupled to the electronic sub-system; power conditioning circuitry coupled to the electronic sub-system; a processing system comprising processing circuitry coupled to memory circuitry, coupled to the power conditioning circuitry and the supervisory circuit, and coupled to the electronic sub-system by the bus; and wherein the processing system is configured to: receive data from the electronic sub-system; determine if a non-hardware fault is detected; if a non-hardware fault is detected, then perform a software reset of the electronics sub-system; if no non-hardware fault has been detected, then determine if a hardware fault is detected; and if a hardware fault is detected, then perform a hardware reset of the system.

Example 2 includes the apparatus of Example 1, wherein the processing system is further configured to: set M to a first value; set N to a second value, where the first value and the second value may be the same or different; if the non-hardware fault is detected, then prior to performing the non-hardware reset of the system: (a) increment or decrement M; (b) determine if an absolute value of M equals or exceeds a first threshold value; (c) perform the software reset only if the absolute value of M is not equal to or does not exceed the first threshold value; and (d) if the absolute value of M equals or exceeds the first threshold value then: (i) increment or decrement N; (ii) determine if an absolute value of N equals or exceeds a second threshold value; and (iii) perform the hardware reset of the system only if the absolute value of N is not equal to or does not exceed the first threshold value, and then receive data from the electronic sub-system; if the non-hardware fault is detected, then prior to performing the non-hardware reset of the system: (a) increment or decrement N; (b) determine if an absolute value of N equals or exceeds a second threshold value; and (c) perform the hardware reset only if the absolute value of N is not equal to or does not exceed the second threshold value, and then receive data from the electronic sub-system.

Example 3 includes the apparatus of any of Examples 1-2, wherein an alarm is sent if at least one of: (a) a non-hardware fault has been detected, and (b) a hardware fault has been detected.

Example 4 includes the apparatus of Example 3, wherein the alarm is sent from the processing system to at least one external system.

Example 5 includes the apparatus of any of Examples 1-4, further comprising: a supervisory circuit coupled to an external power supply and configured to open and close the switch; a switch coupled to the supervisory circuit and the external power supply; wherein the hardware reset is performed by opening and closing the switch; and wherein the switch is radiation hardened.

Example 6 includes the apparatus of any of Examples 1-5, wherein the software reset is performed by reloading all or some of configuration data in the electronic sub-system.

Example 7 includes the apparatus of any of Examples 1-6, wherein the processing system is radiation hardened.

Example 8 includes the apparatus of any of Examples 1-7, wherein determine if a non-hardware fault is detected comprises determine if at least one of the following has occurred: (a) at least one configuration data value is corrupted; (b) data measured by the electronic sub-system is aberrant; (c) data calculated by the electronic sub-system is aberrant; (d) a statistical parameter of at least one of: data measured or calculated by, the electronic sub-system, is aberrant; (e) data communicated by the electronic sub-system to the processing system is corrupted; and (f) a mode of the electronic sub-system or a component of the electronic sub-system, changes unexpectedly.

Example 9 includes the apparatus of any of Examples 1-8, wherein determine if a hardware fault is detected comprises determine if at least one of the following has occurred: (a) at least one configuration data value is corrupted; (b) data measured by the electronic sub-system is aberrant; (c) data calculated by the electronic sub-system is aberrant; (d) a statistical parameter of at least one of: data measured or calculated by, the electronic sub-system, is aberrant; (e) data communicated by the electronic sub-system to the processing system is corrupted; and (f) a mode of the electronic sub-system or a component of the electronic sub-system, changes unexpectedly.

Example 10 includes a method of resetting a system, comprising: receiving data from the electronic sub-system; determine if a non-hardware fault is detected; if a non-hardware fault is detected, then performing a software reset of the electronics sub-system; if no non-hardware fault has been detected, then determining if a hardware fault is detected; and if a hardware fault is detected, then performing a hardware reset of the system.

Example 11 includes the method of Example 10, further comprising: setting M to a first value; setting N to a second value, where the first value and the second value may be the same or different; if the non-hardware fault is detected, then prior to performing the non-hardware reset of the system: (a) incrementing or decrementing M; (b) determining if an absolute value of M equals or exceeds a first threshold value; (c) performing the software reset only if the absolute value of M is not equal to or does not exceed the first threshold value; and (d) if the absolute value of M equals or exceeds the first threshold value then: (i) incrementing or decrementing N; (ii) determining if an absolute value of N equals or exceeds a second threshold value; and (iii) performing the hardware reset of the system only if the absolute value of N is not equal to or does not exceed the first threshold value, and then receiving data from the electronic sub-system; if the non-hardware fault is detected, then prior to performing the non-hardware reset of the system: (a) incrementing or decrementing N; (b) determining if an absolute value of N equals or exceeds a second threshold value; and (c) performing the hardware reset only if the absolute value of N is not equal to or does not exceed the second threshold value, and then receiving data from the electronic sub-system.

Example 12 includes the method of any of Examples 10-11, further comprising sending an alarm if at least one of: (a) a non-hardware fault has been detected, and (b) a hardware fault has been detected.

Example 13 includes the method of any of Examples 10-12, wherein the data is received from an electronic sub-system in the system by a processing system in the system.

Example 14 includes the method of any of Examples 10-13, wherein the software reset is performed by reloading all or some of configuration data in an electronic sub-system in the system.

Example 15 includes the method of any of Examples 10-14, wherein determining if a non-hardware fault is detected comprises determining if at least one of the following has occurred: (a) at least one configuration data value is corrupted; (b) data measured by the electronic sub-system is aberrant; (c) data calculated by the electronic sub-system is aberrant; (d) a statistical parameter of at least one of: data measured or calculated by, the electronic sub-system, is aberrant; (e) data communicated by the electronic sub-system to the processing system is corrupted; and (f) a mode of the electronic sub-system or a component of the electronic sub-system, changes unexpectedly.

Example 16 includes the method of any of Examples 10-15, wherein determining if a hardware fault is detected comprises determining if at least one of the following has occurred: (a) at least one configuration data value is corrupted; (b) data measured by the electronic sub-system is aberrant; (c) data calculated by the electronic sub-system is aberrant; (d) a statistical parameter of at least one of: data measured or calculated by, the electronic sub-system, is aberrant; (e) data communicated by the electronic sub-system to the processing system is corrupted; and (f) a mode of the electronic sub-system or a component of the electronic sub-system, changes unexpectedly.

Example 17 includes a non-transitory computer readable medium configured to reset a system, the non-transitory computer readable medium arranged, when executed, to: receive data from the electronic sub-system; determine if a non-hardware fault is detected; if a non-hardware fault is detected, then perform a software reset of the electronics sub-system; if no non-hardware fault has been detected, then determine if a hardware fault is detected; and if a hardware fault is detected, then perform a hardware reset of the system.

Example 18 includes the non-transitory computer readable medium of Example 17, further comprising: set M to a first value; set N to a second value, where the first value and the second value may be the same or different; if the non-hardware fault is detected, then prior to performing the non-hardware reset of the system: (a) increment or decrement M; (b) determine if an absolute value of M equals or exceeds a first threshold value; (c) perform the software reset only if the absolute value of M is not equal to or does not exceed the first threshold value; and (d) if the absolute value of M equals or exceeds the first threshold value then: (i) increment or decrement N; (ii) determine if an absolute value of N equals or exceeds a second threshold value; and (iii) perform the hardware reset of the system only if the absolute value of N is not equal to or does not exceed the first threshold value, and then receive data from the electronic sub-system; if the non-hardware fault is detected, then prior to performing the non-hardware reset of the system: (a) increment or decrement N; (b) determine if an absolute value of N equals or exceeds a second threshold value; and (c) perform the hardware reset only if the absolute value of N is not equal to or does not exceed the second threshold value, and then receive data from the electronic sub-system.

Example 19 includes the non-transitory computer readable medium of any of Examples 17-18, wherein determine if a non-hardware fault is detected comprises determine if at least one of the following has occurred: (a) at least one configuration data value is corrupted; (b) data measured by the electronic sub-system is aberrant; (c) data calculated by the electronic sub-system is aberrant; (d) a statistical parameter of at least one of: data measured or calculated by, the electronic sub-system, is aberrant; (e) data communicated by the electronic sub-system to the processing system is corrupted; and (f) a mode of the electronic sub-system or a component of the electronic sub-system, changes unexpectedly.

Example 20 includes the non-transitory computer readable medium of any of Examples 17-19, wherein determine if a hardware fault is detected comprises determine if at least one of the following has occurred: (a) at least one configuration data value is corrupted; (b) data measured by the electronic sub-system is aberrant; (c) data calculated by the electronic sub-system is aberrant; (d) a statistical parameter of at least one of: data measured or calculated by, the electronic sub-system, is aberrant; (e) data communicated by the electronic sub-system to the processing system is corrupted; and (f) a mode of the electronic sub-system or a component of the electronic sub-system, changes unexpectedly.

The processor circuitry described herein may include one or more microprocessors, microcontrollers, digital signal processing (DSP) elements, application-specific integrated circuits (ASICs), complex programmable logic device, and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk—Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium and executed by the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g. data files. Although separate databases may be recited herein, one or more of such databases may be combined.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus, comprising:
   an electronic sub-system;
   a bus coupled to the electronic sub-system;
   power conditioning circuitry coupled to the electronic sub-system; and
   processing circuitry, coupled to the power conditioning circuitry, and coupled to the electronic sub-system by the bus;
   wherein the processing circuitry is configured to:
      set variable M to a first value;
      set variable N to a second value, where the first value and the second value may be same or different;
      receive data from the electronic sub-system;
      determine if a non-hardware fault is detected;
      determine that the non-hardware fault is detected, then:

(a) increment or decrement the variable M;
(b) determine if an absolute value of the variable M equals or exceeds a first threshold value;
(c) determine that the absolute value of the variable M is not equal to and does not exceed the first threshold value, then perform a software reset of the electronic sub-system; and
(d) determine that the absolute value of the variable M equals or exceeds the first threshold value, then:
  (i) increment or decrement the variable N;
  (ii) determine if an absolute value of the variable N equals or exceeds a second threshold value; and
  (iii) determine that the absolute value of the variable N is not equal to and does not exceed the second threshold value, then perform a hardware reset of the apparatus, and then receive data from the electronic sub-system; and
determine that no non-hardware fault has been detected, then determine if a hardware fault is detected; and
determine that the hardware fault is detected, then:
  (a) increment or decrement the variable N;
  (b) determine if the absolute value of the variable N equals or exceeds the second threshold value; and
  (c) determine that the absolute value of the variable N is not equal to and does not exceed the second threshold value, then perform the hardware reset of the apparatus, and then receive data from the electronic sub-system.

2. The apparatus of claim 1, wherein an alarm is sent if at least one of: (a) the non-hardware fault has been detected, and (b) the hardware fault has been detected.

3. The apparatus of claim 2, wherein the alarm is sent from the processing circuitry to at least one external system.

4. The apparatus of claim 1, further comprising:
a supervisory circuit coupled to an external power supply and configured to open and close a switch;
the switch coupled to the supervisory circuit and the external power supply; and
wherein the hardware reset is performed by opening and closing the switch;
wherein the switch is radiation hardened.

5. The apparatus of claim 1, wherein the software reset is performed by reloading all or some of configuration data in the electronic sub-system.

6. The apparatus of claim 1, wherein the processing circuitry is radiation hardened.

7. The apparatus of claim 1, wherein determine that the non-hardware fault is detected comprises determine if at least one of a following has occurred:
(a) at least one configuration data value is corrupted;
(b) data measured by the electronic sub-system is aberrant;
(c) data calculated by the electronic sub-system is aberrant;
(d) a statistical parameter of at least one of: the data measured or calculated by, the electronic sub-system, is aberrant;
(e) data communicated by the electronic sub-system to the processing circuitry is corrupted; and
(f) a mode of the electronic sub-system, or a component of the electronic sub-system, changes unexpectedly.

8. The apparatus of claim 1, wherein determine that the hardware fault is detected comprises determine if at least one of a following has occurred:
(a) at least one configuration data value is corrupted;
(b) data measured by the electronic sub-system is aberrant;
(c) data calculated by the electronic sub-system is aberrant;
(d) a statistical parameter of at least one of: the data measured or calculated by, the electronic sub-system, is aberrant;
(e) data communicated by the electronic sub-system to the processing circuitry is corrupted; and
(f) a mode of the electronic sub-system, or a component of the electronic sub-system, changes unexpectedly.

9. A method of resetting a system comprising an electronic sub-system, comprising:
setting variable M to a first value;
setting variable N to a second value, where the first value and the second value may be same or different receiving data from the electronic sub-system;
determining if a non-hardware fault is detected;
determining that the non-hardware fault is detected, then:
  (a) incrementing or decrementing the variable M;
  (b) determining if an absolute value of the variable M equals or exceeds a first threshold value;
  (c) determining that the absolute value of the variable M is not equal to and does not exceed the first threshold value, then performing a software reset of the electronic sub-system; and
  (d) determining that the absolute value of the variable M equals or exceeds the first threshold value, then:
    (i) incrementing or decrementing the variable N;
    (ii) determining if an absolute value of the variable N equals or exceeds a second threshold value; and
    (iii) determining that the absolute value of the variable N is not equal to and does not exceed the second threshold value, then performing a hardware reset of the system, and then receiving data from the electronic sub-system; and
determining that no non-hardware fault has been detected, then determining if a hardware fault is detected; and
determining that the hardware fault is detected, then:
  (a) incrementing or decrementing the variable N;
  (b) determining if the absolute value of the variable N equals or exceeds the second threshold value; and
  (c) determining that the absolute value of the variable N is not equal to and does not exceed the second threshold value, then performing the hardware reset of the system, and then receiving data from the electronic sub-system.

10. The method of claim 9, further comprising sending an alarm if at least one of: (a) the non-hardware fault has been detected, and (b) the hardware fault has been detected.

11. The method of claim 9, wherein the data is received from the electronic sub-system in the system by a processing system in the system.

12. The method of claim 9, wherein the software reset is performed by reloading all or some of configuration data in the electronic sub-system of the system.

13. The method of claim 9, wherein determining that the non-hardware fault is detected comprises determining if at least one of a following has occurred:
(a) at least one configuration data value is corrupted;
(b) data measured by the electronic sub-system is aberrant;
(c) data calculated by the electronic sub-system is aberrant;
(d) a statistical parameter of at least one of: the data measured or calculated by, the electronic sub-system, is aberrant;

(e) data communicated by the electronic sub-system to a processing system is corrupted; and
(f) a mode of the electronic sub-system, or a component of the electronic sub-system, changes unexpectedly.

14. The method of claim 9, wherein determining that the hardware fault is detected comprises determining if at least one of a following has occurred:
(a) at least one configuration data value is corrupted;
(b) data measured by the electronic sub-system is aberrant;
(c) data calculated by the electronic sub-system is aberrant;
(d) a statistical parameter of at least one of: the data measured or calculated by, the electronic sub-system, is aberrant;
(e) data communicated by the electronic sub-system to a processing system is corrupted; and
(f) a mode of the electronic sub-system, or a component of the electronic sub-system, changes unexpectedly.

15. A non-transitory computer readable medium storing a program configured to cause at least one processor to execute a process configured to reset a system comprising an electronic sub-system, the process comprising:
setting variable M to a first value;
setting variable N to a second value, where the first value and the second value may be same or different receiving data from the electronic sub-system;
determining if a non-hardware fault is detected;
determining that the non-hardware fault is detected, then:
(a) incrementing or decrementing the variable M;
(b) determining if an absolute value of the variable M equals or exceeds a first threshold value;
(c) determining that the absolute value of the variable M is not equal to and does not exceed the first threshold value, then performing a software reset of the electronic sub-system; and
(d) determining that the absolute value of the variable M equals or exceeds the first threshold value, then:
(i) incrementing or decrementing the variable N;
(ii) determining if an absolute value of the variable N equals or exceeds a second threshold value; and
(iii) determining that the absolute value of the variable N is not equal to and does not exceed the second threshold value, then performing a hardware reset of the system, and then receiving data from the electronic sub-system; and determining that no non-hardware fault has been detected, then determining if a hardware fault is detected; and
determining that the hardware fault is detected, then:
(a) incrementing or decrementing the variable N;
(b) determining if the absolute value of the variable N equals or exceeds the second threshold value; and
(c) determining that the absolute value of the variable N is not equal to and does not exceed the second threshold value, then performing the hardware reset of the system, and then receiving data from the electronic sub-system.

16. The non-transitory computer readable medium of claim 15, wherein determining that the non-hardware fault is detected comprises determining if at least one of a following has occurred:
(a) at least one configuration data value is corrupted;
(b) data measured by the electronic sub-system is aberrant;
(c) data calculated by the electronic sub-system is aberrant;
(d) a statistical parameter of at least one of: the data measured or calculated by, the electronic sub-system, is aberrant;
(e) data communicated by the electronic sub-system to a processing system is corrupted; and
(f) a mode of the electronic sub-system, or a component of the electronic sub-system, changes unexpectedly.

17. The non-transitory computer readable medium of claim 15, wherein determining that the hardware fault is detected comprises determining if at least one of a following has occurred:
(a) at least one configuration data value is corrupted;
(b) data measured by the electronic sub-system is aberrant;
(c) data calculated by the electronic sub-system is aberrant;
(d) a statistical parameter of at least one of: the data measured or calculated by, the electronic sub-system, is aberrant;
(e) data communicated by the electronic sub-system to a processing system is corrupted; and
(f) a mode of the electronic sub-system, or a component of the electronic sub-system, changes unexpectedly.

* * * * *